United States Patent Office 3,598,853
Patented Aug. 10, 1971

3,598,853
METHOD OF PREPARING AMINOISOALKOXY-ALKYLSILANES AND 3-(2-METHYL-3-AMINO-PROPOXY) PROPYLTRIMETHOXYSILANE PRODUCED THEREBY
Norman J. Friedman, Latham, and Abe Berger and Terry G. Selin, Schenectady, N.Y., assignors to General Electric Company
No Drawing. Filed July 17, 1968, Ser. No. 745,345
Int. Cl. C07f 7/02, 7/04
U.S. Cl. 260—448.8R  7 Claims

ABSTRACT OF THE DISCLOSURE

A quaternary ammonium hydroxide type of ion exchange resin is used in a cyanoethylation type reaction between a branched chain olefinic nitrile and an unsaturated alcohol. The cyano(branched alkoxy)alkene produced is then reacted with a silane by an SiH-olefin addition reaction. The corresponding amine is made from the nitrile by hydrogenation at low pressure. One of the silanes produced by the above method, 3-(2-methyl-3-aminopropoxy)propyltrimethoxysilane, is an exceptionally valuable component in detergent resistant polishes.

---

This invention relates to organosilicon compounds containing organic radicals, hydrolyzable groups and aminoalkoxyalkyl radicals attached to silicon and to the use of such compounds.

Silanes containing aminoalkoxyalkyl radicals are known in the art. These materials are difficult to prepare, expensive, and unstable. In addition, by-products produced in the synthesis of these prior art silanes, which by-products can be removed only with the greatest difficulty, tend to mask the desirable properties of these silanes.

In spite of the existence of these prior art silanes, problems continued to exist in the field of detergent resistant polishes and room temperature curable silicone compositions which cure to a tough completely transparent film rapidly without any formation of corrosive by-products. These problems were further compounded by the fact that known methods for making aminoalkoxyalkylsilanes resulted in low yields of the desired product and high yields of undesired impurities. The manufacture of aminoalkoxylalkylsilanes containing chain branching in the alkoxy group presented a much more difficult problem and is probably the reason these materials were unknown in the prior art. The presence of chain branching in a nitrile containing conjugated unsaturation interferes with and changes the reactivity of the nitrile compound. Thus basic catalysts normally used in cyanoethylation reactions result in poor yields when a branched chain conjugated nitrile such as methacrylonitrile is used in a cyanoethylation type reaction.

We have unexpectedly discovered that when a quaternary ammonium hydroxide type of ion exchange resin is used in a cyanoethylation type reaction between a branched chain nitrile containing conjugated unsaturation and an alcohol containing olefinic unsaturation, that the reaction proceeds with no difficulty, the yield of product is almost quantitative and by-product yields are so low that they can be considered negligible in most applications. The cyano(branched alkoxy)alkene produced by such a reaction can be converted to a cyano(branched alkoxy)alkylsilane by an SiH-olefin addition reaction with a silane containing one silanic hydrogen atom. The cyano (branched alkoxy)alkylsilane thus produced can be reduced to the corresponding amine by low pressure hydrogenation in the presence of a Raney nickel catalyst. A particularly desirable product is 3-(2-methyl-3-aminopropoxy)propyltrimethoxysilane. This material is unique in that when it is used in a detergent resistant polish it imparts a faster cure to the polish composition and the film produced from such a composition is much harder and has much better detergent resistance than if there is no branching in the carbon chain.

This invention is concerned with the method of making amino(branched alkoxy)alkyl silane compounds of the formula (1) 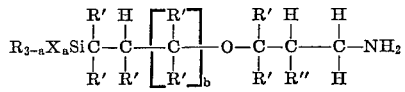

In the above formula and in the formulas that follow, R is a monovalent organic radical, R' is a monovalent organic radical or hydrogen, R" is a lower alkyl radical, X is a hydrolyzable radical, $a$ has a value of zero to 3 and $b$ has a value of one to 4. This invention is also concerned with an unusual product within the scope of Formula 1. The product is 3-(2-methyl-3-aminopropoxy) propyltrimethoxysilane which has the formula:

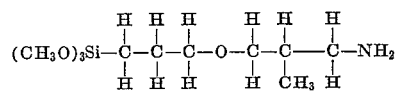

More specifically in the above Formula 1 and the formulas that follow, R is a radical selected from the class consisting of lower alkyl radicals, e.g., methyl, ethyl, propyl, butyl, octyl, etc. radicals; cycloalkyl radicals having 5 to 7 carbon atoms in the ring, e.g., cyclopentyl, cyclohexyl, cycloheptyl, etc. radicals; mononuclear and binuclear aryl radicals, e.g., phenyl, tolyl, naphthyl, xylyl, biphenyl, etc. radicals; and mononuclear aryl lower alkyl radicals, e.g., benzyl, phenylethyl, etc. radicals. R' is a radical selected from the class consisting of lower alkyl radicals, e.g., methyl, ethyl, propyl, butyl, pentyl, heptyl, etc. radicals; cycloalkyl radicals having 5 to 7 carbon atoms in the ring, e.g., cyclopentyl, cyclohexyl, cycloheptyl, etc. radicals; further radicals where two R' radicals attached to the same carbon atom, taken together with the carbon atom to which they are attached form a cycloalkyl radical having 5 to 7 carbon atoms in the ring, e.g., cyclopentyl, cyclohexyl, cycloheptyl, etc. radicals and hydrogen; R" is a lower alkyl radical selected from the class comprising methyl, ethyl, propyl, butyl, pentyl, heptyl, etc. radicals; X is a hydrolyzable radical selected from the class comprising lower alkoxy radicals, e.g., methoxy, ethoxy, propoxy, etc. radicals; mononuclear aryloxy radicals, e.g., phenoxy radicals; lower dialkylamino radicals, e.g., dimethylamino, diethylamino, dipentylamino etc. radicals and lower dialkylaminoxy radicals, e.g., dimethylaminoxy, dibutylaminoxy, dihexylaminoxy etc. radicals.

The prefix "lower" used above modifying radicals, indicates that the alkyl groups contained on the radicals each have 8 or fewer carbon atoms. Amino(branched alkoxy) silanes within the scope of the present invention include, for example, compounds represented by the following formulas:

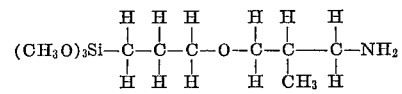

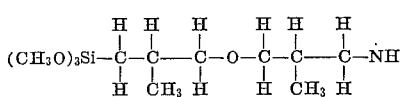

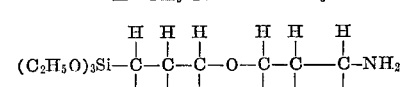

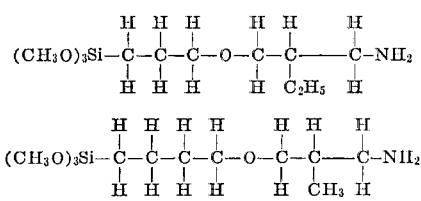

The amino(branched alkoxy)alkyl silanes of Formula 1 are made by the following series of reactions. A branched chain nitrile of the formula:

(2) 

is reacted with an unsaturated alcohol of the formula:

(3) 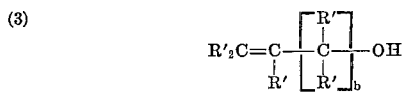

in the presence of a quaternary ammonium hydroxide type of ion exchange resin. The use of a quaternary ammonium hydroxide type of ion exchange resin in a cyanoethylation type reaction not involving branched chain nitriles is known in the art, e.g., M. J. Astle and R. W. Etherington, Ind. and Eng. Chem. 44 2871 (1952). The quaternary ammonium hydroxide type of ion exchange resin used in the practice of the present invention is described by the formula:

(4) 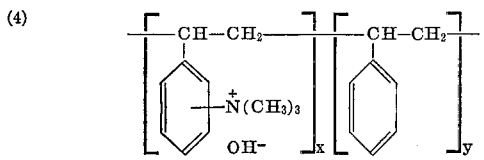

In the above formula, $x$ has a value of 1,000 to 1,000,000 and $y$ has a value of 2,000 to 2,000,000. The resin can be used in the cross-linked form in which case from 1 to 15 mole percent of the monomer derived units in the resin are derived from divinylbenzene cross linker. The resin contains from 3.0 to 6.6 milliequivalents of hydroxyl groups per gram of dry resin and preferably 3.3 milliequivalents of hydroxyl groups per gram of dry resin. The hydroxyl groups constitute from 0.8 to 1.90 milliequivalents per milliliter of wet resin. Quaternary ammonium hydroxide groups constitute 70 to 100 percent of the amine groups and 0 to 30 percent of the amine groups can be tertiary amine groups. The resin preferably has a mesh size of 10 to 400 mesh in the wet or dry form. While the resin is preferably in the quaternary ammonium hydroxide form it can also be in the quaternary ammonium ethoxide or quaternary ammonium methoxide form. The resin preferably has a molecular weight between 1 and 10 million.

While resins having varying water content are operative in the practice of the present invention, the best results are obtained when the resin contains on a weight basis from 50 to 60 percent of water. In the preferred embodiment of the invention, the quaternary ammonium hydroxide is placed in the thimble of a Soxhlet extractor and the reactants are dissolved in a solvent such as toluene and placed in a flask. The Soxhlet extractor is fitted with a reflux condensor and attached to the flask. Refluxing of the mixture causes the reactants to collect in the Soxhlet extractor, which functions as a reactor, react and then collect in the heated flask with the lower boiling reactants being recycled to the Soxhlet extractor. The product of this reaction has the formula:

(5) 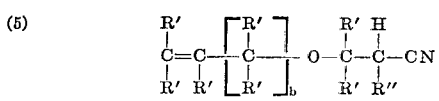

The solvent used in the reaction preferably has a boiling point lower than the boiling point of the final product. The use of such a solvent prevents excessive temperature build-up in the flask which excessive temperature can cause degradation of the product. Solvents which are well suited for the reaction include mononuclear lower alkyl solvents such as toluene, xylene, ethylbenzene, etc. A solvent is not required, as the reaction will proceed without a solvent, but yields are better and less impurity is formed when a solvent is used.

The cyanoalkoxyalkene described in Formula 5 is then reacted with a silane within the scope of the formula $R_{3-a}X_aSiH$ in the presence of a platinum compound catalyst to produce a cyanoalkoxyalkylsilane of the formula:

(6) 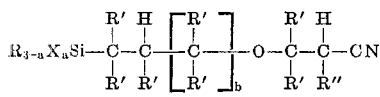

The platinum compound catalyst can be selected from that group of platinum compound catalysts which are operative to catalyze the addition of silicon hydrogen bonds across olefinic bonds.

Among the many useful catalysts for this addition reaction are chloroplatinic acid as described in U.S. Pat. 2,823,218—Speier et al. the reaction product of chloroplatinic acid with either an alcohol, an ether or an aldehyde as described in U.S. Pat. 3,220,972—Lamoreaux, trimethylplatinum iodide and hexamethyldiplatinum as described in U.S. Pat. 3,313,773—Lamoreaux, the platinum olefin complex catalysts as described in U.S. Pat. 3,159,601 of Ashby and the platinum cyclopropane complex catalyst as described in U.S. Pat. 3,159,662 of Ashby.

The SiH olefin addition reaction may be run at room temperature or at temperatures up to 200° C. depending upon catalyst concentration. The catalyst concentration can vary from $10^{-7}$ to $10^{-3}$ and preferably from $10^{-5}$ to $10^{-4}$ moles of platinum as metal per mole of olefin containing molecules present.

When the cyanoalkoxyalkylsilane as described in Formula 6 contains halide radicals as the hydrolyzable groups, these groups may be replaced with alkoxy groups. The alkoxylation can be accomplished by reacting the cyanoalkoxyalkylsilane containing hydrolyzable silicon bonded halide radicals with a non-acid forming material such as a lower alkyl orthoformate, preferably methylorthoformate.

After the alkoxy derivative is formed from the corresponding halide containing material or directly as the case may be, the nitrile radical is converted to an amine radical by hydrogenation. The hydrogenation is conducted at from 20 to 4000 p.s.i. at 50° to 150° C. in the presence of an hydrogenation catalyst such as nickel or cobalt.

The preferred conditions of the hydrogenation are a pressure of 20 to 100 p.s.i., a temperature of 30°–120° C., and the presence of a Raney nickel catalyst. The catalyst preferably contains no acidic impurities, as these interfere with the reaction and cause the formation of undesirable by-products. It was quite unexpected that the hydrogenation could be accomplished at 20 to 100 p.s.i., as the usual pressure conditions for this type of reaction are generally in the range of 1000 to 2000 p.s.i. The hydrogenation step is represented by the following general equation.

(6) 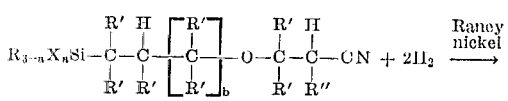

(7) 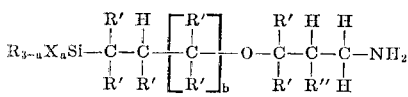

Branched chain nitriles within the scope of Formula 2 include:

2-methyl-3-phenyl acrylonitrile

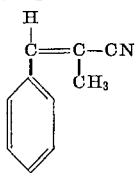

2-methyl crotonitrile

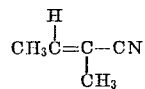

2-ethyl crotonitrile

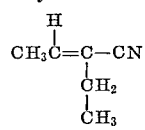

2-ethyl acrylonitrile

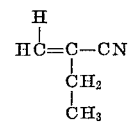

Unsaturated alcohols included within the scope of Formula 3 include:

allyl alcohol
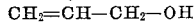

3-methyl-1-butene-3-ol
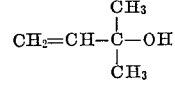

methallyl alcohol
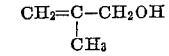

crotyl alcohol
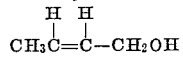

3-methyl-1-pentene-3-ol
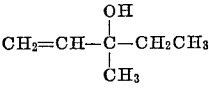

3-cyclohexyl-1-butene-3-ol
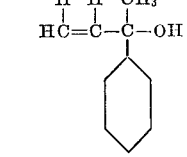

The following examples are both illustrative of the invention and are set forth to show the advantages of the present invention and are not intended for purposes of limitation. All parts unless otherwise indicated are by weight. The catalyst which was used in the SiH-olefin addition reactions in the following examples was a platinum coordinate catalyst formed by the reaction of chloroplatinic acid and octyl alcohol. The preparation of the catalyst is disclosed in Example 1 of U.S. Pat. 3,220,972 of Lamoreaux. Chemical analysis of the catalyst solution showed it to contain 3.5 atoms of chlorine per atom of platinum and 0.035 gram of platinum per gram of solution.

The ion exchange resin which was used in the cyanoethylation type reaction was Rexyn 201 which is commercially available from the Fisher Scientific Company, Fairlawn, N.J. The resin is within the scope of formula:

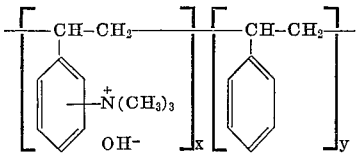

and has the following specifications: 4.7 milliequivalents of hydroxyl per gram of dry resin, 1.06 millequivalents of hydroxyl permilliliter of wet resin, 53% water, a density of 328 grams per liter, a screen size of 16 to 50 mesh. The resin contains 15% by weight by cross-linkers derived from divinylbenzene and has a molecular weight between 1 and 10 million. An equivalent, if not identical, resin is Ionac AGA 542 available from Ionac Chemical Company of Birmingham, N.J. Similar resins are also available from the Rohm & Haas Company of Philadelphia and the Dow Chemical Company of Midland, Mich.

In a typical preparation of 3-(3-aminopropoxy)propyltrimethoxysilane employed in the following examples, for comparison purposes with the composition of the present invention, 150 parts of 3-(2-cyanoethoxy)propyltrimethoxysilane, 12 parts of finely divided Raney nickel catalyst and 0.5 part sodium methoxide were placed in a reaction vessel which was pressurized to about 55 p.s.i. with hydrogen. The reaction mixture was then heated to a temperature of 100°–120° C. and the pressure of hydrogen gas was maintained at about 55 p.s.i. After hydrogen absorption ceased after 3 hours, pressure on the system was released and the liquid product was decanted from solids and fractionally distilled to produce 128 parts of 3-(3-aminopropoxy)propyltrimethoxysilane having a boiling point of 140° C. at 5 mm.

EXAMPLE 1

To a one-necked flask was added 58 parts of allyl alcohol, 67 parts of methacrylonitrile and 63 parts of toluene. To the thimble of Soxhlet extractor was added 10 parts of Rexyn 201, the polystyrene supported amine hydroxide ion-exchange resin described earlier. The Soxhlet extractor was fitted with a reflux condenser and attached to the flask. The mixture was stirred at reflux by means of a magnetic stirrer. During a period of 5 hours the temperature slowly rose from 90° C. to 150° C. The toluene was then fractionally distilled from the reaction product at 350 mm. Hg. The pressure was dropped to 1.4 mm. Hg where the product distilled over at 53° C. There was obtained 123 parts of 3 - (2-methyl-2-cyanoethoxy)propene-1 (98% of theory). In a 1000 ml. 3-necked flask equipped with magnetic stirrer, reflux condenser, thermometer, and addition funnel was placed 25.0 parts of 3-(2-methyl-2-cyanoethyoxy)propene and 0.2 part of platinum coordinate catalyst solution. To the addition funnel was charged 24 parts of trimethoxysilane. By means of a heating mantle, the olefin was heated to 140° C. The heating mantle was then turned off and the trimethoxysilane was added dropwise. Stirring was provided throughout the addition by means of the magnetic stirrer. An exothermic reaction was noted which carried the reaction temperature to 172° C. However, after about half of the silane had been added, the reaction temperature began to fall. Heat was again supplied to maintain a temperature of 170–175° C. during the remainder of the addition. Following the addition, the mixture was refluxed for an additional 2 hours (170° C.) then flash distilled at reduced pressure to recover the adduct. Thus was obtained 31.5 parts of material boiling at 135–140° C./3.5 mm. Hg whose infrared spectrum was consistent with the structure of 3-(2-methyl-2-cyanoethoxy)propyltrimethoxysilane.

Into a 500 ml. pressure bottle was placed 10.8 parts of 3 - (2-methyl-2-cyanoethoxy)propyltrimethoxysilane and 1.5 parts of Raney nickel catalyst. The bottle was then placed in a Parr Hydrogenator and pressurized with hydrogen to 55 p.s.i. Shaking was started as the reaction mixture was heated to 100° C. As the pressure dropped to 30 p.s.i., additional hydrogen gas was introduced to maintain a pressure of 55 p.s.i. After a time interval of 8 hours a total pressure drop of 77 p.s.i. was recorded and further pressure drop did not occur. The excess pressure of the cooled system was released and a dark reddish brown liquid was decanted from the catalyst. Distillation yielded 7.0 parts of 3-(2-methyl-3-aminopropoxy)propyltrimethoxysilane B.P. 104° C./0.7 mm. An IR scan of the product showed complete absence of nitrile absorption and appearance of amine absorption at 2.9, 3.1 and 6.25.

EXAMPLE 2

To a reaction vessel was added 60 parts of a silanol chain-stopped polydimethylsiloxane of the formula

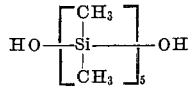

16 parts of 3-(2-methyl - 3 - aminopropyoxy)propyltrimethoxysilane, and 25 parts of 3 - amino-propyltrimethoxysilane. This reaction mixture was thoroughly mixed and then 0.5 part water was added with stirring. This resulted in an organopolysiloxane copolymer within the scope of the present invention having a viscosity of about 150 centistokes containing about 7.9 percent by weight methoxy groups and in which 79.2 mole percent of the siloxane units were derived from the silanol chain-stopped polydimethylsiloxane, 6.8 mole percent of the siloxane units were derived from 3-(2-methyl-3-aminopropoxy) propyltrimethoxysilane, and 14.0 mole percent of the siloxane units were derived from 3-aminopropyltrimethoxysilane.

Seven parts of the copolymer were converted to the partial aliphatic carboxylic acid salt by reaction with 0.35 part acetic acid to produce a product in which 38 mole percent of the amine groups were converted to the amine salt of acetic acid.

The partial acetic acid salt was incorporated into a polish emulsion by forming a mixture of 2.62 parts of the salt, 2 parts of a methyl silicone oil having a viscosity of 10,000 centistokes at 25° C., 2 parts of a sorbitan monooleate emulsifier, 0.2 part of a polyoxyethylene sorbitan monooleate emulsifier, 20.0 parts mineral spirits, and 15.0 parts kerosene. After these components were thoroughly mixed, 50.3 parts of water was added with high shear agitation to form an emulsion. To this emulsion was then added 8.0 parts of aluminum silicate to produce a combination cleaner-polish emulsion within the scope of the present invention. One sample of this emulsion was retained for evaluation of emulsion stability and was stable after 6 months. As a first control, a copolymer was made as in Example 1, but was not converted to the partial carboxylic acid salt. Instead, this copolymer was converted directly into an emulsion using the exact formulation described above. This control was stable at room temperature for less than 2 days before separating.

As a second control, the procedure of Example 1 was followed to produce a copolymer from 60 parts of the silanol chain-stopped dimethylpolysiloxane and 40 parts of the 3-aminopropyltrimethoxysilane, but with the 3-(2-methyl - 3 - aminopropoxy)propyltrimethoxysilane replaced by 3 - (3-aminopropoxy)propyltrimethoxysilane. This material was converted to a partial acetic acid salt in which 37 percent of the amine groups had been converted to the acetic acid salt of the amine and then the salt was added to a polish formulation. This, too, resulted in a stable emulsion.

In order to compare the composition of the present invention prepared in Example 1 with the second control prepared using 3 - (3-aminopropoxy)propyltrimethoxysilane, two sections of a painted automobile panel were polished side by side with each composition. The formulation containing the 3-(2-methyl-3-aminopropoxy)propyltrimethoxysilane of the present invention cured faster than the second control and resulted in a harder film than the second control. The film hardness was determined by the number of scratch marks on the panels caused by hard rubbing with cheesecloth. Both compositions were evaluated for detergent resistance. The control survived 30 detergent washing cycles and the polish composition containing the 3 - (2-methyl-3-aminopropoxy)propyltrimethoxysilane survived 40 detergent washing cycles. Each detergent washing cycle involved washing the panel in a 3 percent solution of a conventional automobile washing detergent at a temperature of 120° F. The panels were then washed with water and air dried.

EXAMPLE 3

To a one-necked flask was added 58 parts of allyl alcohol and a catalyst solution consisting of 5 parts of 40% benzyltrimethylammonium hydroxide in methanol and 63 parts of toluene. The catalyst was thoroughly mixed into the allyl alcohol and the mixture was heated to 85° C. Crotononitrile was then added dropwise. The reaction was very exothermic and was controlled by rate of addition to a range of 110 and 130° C. After 67 parts of crotononitrile had been added the reaction mixture was heated at 120° C. for two hours. The base was then neutralized with trimethylchlorosilane and the reaction product was cooled. The pressure was dropped to 0.5 mm. Hg where the product distilled over at 52° C. There was obtained 106 parts of 3-(1-methyl-2-cyanoethoxy)propene-1 (85% of theory).

In a 1000 ml. 3-necked flask equipped with magnetic stirrer, reflux condenser, thermometer, and addition funnel was placed 25.0 parts of 3-(1-methyl-2-cyanoethoxy) propene and 0.2 part of the platinum coordinate catalyst solution. To the addition funnel was charged 24 parts of the trimethoxysilane. By means of a heating mantle, the olefin was heated to 140° C. The heating mantle was then turned off and the trimethoxysilane was added dropwise. Stirring was provided throughout the addition by means of the magnetic stirrer. An exothermic reaction was noted which carried the reaction temperature to 130–160° C. Following the addition, the mixture was refluxed for an additional 12 hours then flash distilled at reduced pressure to recover the adduct. Thus was obtained 30 parts of material boiling at 120–127° C./1.5 mm. Hg whose infrared spectrum was consistent with the structure of 3-(1-methyl-2-cyanoethoxy)propyltrimethoxysilane.

Into a 500 ml. pressure bottle was placed 10.8 parts of 3 - (1-methyl-2-cyanoethoxy)propyltrimethoxysilane and 1.5 parts of Raney nickel catalyst. The bottle was then placed in a Parr Hydrogenator and pressurized with hydrogen to 55 p.s.i. Shaking was started as the reaction mixture was heated to 100° C. As the pressure dropped to 30 p.s.i., additional hydrogen gas was introduced to maintain a pressure of 55 p.s.i. After a time interval of 8 hours a total pressure drop of 77 p.s.i. was recorded and further pressure drop did not occur. The excess pressure of the cooled system was released and a dark reddish brown liquid was decanted from the catalyst. Distillation yielded 7.0 parts of 3-(1-methyl-3-aminopropoxy)propyltrimethoxysilane B.P. 120° C./1.5 mm. Hg. An IR scan of the product showed complete absence of nitrile absorption and appearance of amine absorption at 2.9, 3.1 and 6.25 microns.

To a reaction vessel was added 60 parts of a silanol chain-stopped polydimethylsiloxane of the formula

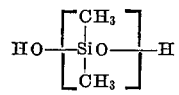

16 parts of 3-(1-methyl-3-aminopropoxy)propyltrimethoxy, and 25 parts of 3-aminopropyltrimethoxysilane. This reaction mixture was thoroughly mixed and then 0.5 part water was added with stirring. This resulted in an organopolysiloxane copolymer within the scope of the present invention having a viscosity of about 150 centistokes containing about 7.9 percent by weight methoxy groups and in which 79.2 mole percent of the siloxane units were derived from the silanol chain-stopped polydimethylsiloxane, 6.8 mole percent of the siloxane units were derived from 3-(1-methyl-3-aminopropoxy)propyltrimethoxysilane, and 14.0 mole percent of the siloxane units were derived from 3-aminopropyltrimethoxysilane.

Seven parts of the copolymer were converted to the partial aliphatic carboxylic acid salt by reaction with 0.35 part acetic acid to produce a product in which 38 mole percent of the amine groups were converted to the amine salt of acetic acid.

The partial acetic acid salt was incorporated into a polish emulsion by forming a mixture of 2.62 parts of the salt, 2 parts of a methyl silicone oil having a viscosity of 10,000 centistokes at 25° C., 2 parts of a sorbitan monooleate emulsifier, 0.2 part of a polyoxyethylene sorbitan monooleate emulsifier, 20.0 parts mineral spirits, and 15.0 parts kerosene. After these components were thoroughly mixed, 50.3 parts of water were added with high shear agitation to form an emulsion. To this emulsion was then added 8.0 parts of aluminum silicate to produce a combination cleaner-polish emulsion within the scope of the present invention. One sample of this emulsion was retained for evaluation of emulsion stability and was stable after 8 months.

In order to compare the polish prepared using the 3-(1-methyl-3-aminopropoxy)propyltrimethoxysilane with that prepared from 3-(2-methyl-3-aminopropoxy)propyltrimethoxysilane, two sections of a painted automobile panel were polished side by side with each composition. The polish prepared from the 2-(1-methyl-3-aminopropoxy)propyltrimethoxysilane had better gloss than the polish prepared from 3-(2-methyl-3-aminopropoxy)propyltrimethoxysilane. Both the compositions were evaluated yltrimethoxysilane. Both the compositions were evaluated for detergent resistance. The polish prepared from 3-(2-methyl-3-aminopropoxy)propyltrimethoxysilane survived 40 detergent washing cycles and the polish composition containing the 3 - (1-methyl-3-aminopropoxy)propyltrimethoxysilane survived 15 detergent washing cycles.

The following examples are included to compare the method of the present invention with methods employing various other base catalysts.

EXAMPLE 4

To a three-necked flask as described in Example 3 was added 58 parts of allyl alcohol and 7 parts of benzyltriethylammonium hydroxide (as a 40% solution in methanol). To the addition funnel was placed 67 parts of methacrylonitrile. By means of a heating mantle, the flask containing the alcohol and catalyst was heated to 45° C. Over a 10 hour period, the methacrylonitrile was added to the flask. After all the methacrylonitrile was added, with no evident exotherm, the flask was heated for an additional two hours at 45° C. The solution became dark brown with a heavy deposit of dark brown solids on the walls of the flask. After distilling out the unreacted raw materials, there was obtained 53 parts of a fraction boiling at 55° C./1.4 mm. (43% of theory). The infrared spectrum of this fraction was consistent with the structure of 3-(2-methyl-2-cyanoethoxy)propene-1.

EXAMPLE 5

Using the method described in Example 4, 67 parts of methacrylonitrile were slowly added to 58 parts of allyl alcohol and 5 parts of benzyltrimethylammonium hydroxide (as a 40% solution in methanol). There was obtained 49 parts of material (39% of theory) consistent with the structure prepared in Example 4.

EXAMPLE 6

Using the method described in Example 5, 67 parts of methacrylonitrile were slowly added to 58 parts of allyl alcohol and 4 parts of sodium hydroxide (as pellets).

There was obtained 60 parts of material (48% of theory) consistent with the material prepared in Example 5.

EXAMPLE 7

Using the method described in Example 6, 67 parts of methacrylonitrile was slowly added to 58 parts of allyl alcohol and 6 parts of potassium hydroxide (as pellets). There was obtained 58 parts of material (46% of theory) consistent with the material prepared in Example 6.

While the foregoing examples have illustrated many of the embodiments of our invention, it should be understood that our invention relates broadly to a method of making a specific class of aminoalkoxyalkylsilanes and to a particular member of that class which is especially useful in detergent resistant polish applications. Variations of the inventive method set forth in Example 1 are, of course, possible and in many cases, in fact, desirable. For example, instead of using a Soxhlet type apparatus, batch process apparatus may be used with the Rexyn 201 catalyst added directly to the reaction mixture. In such a case yields are decreased somewhat, to approximately 70%. They are still much higher than other methods.

What we claim as new and desire to secure by Letters Patent of the United States is:

1. 3 - (2 - methyl - 3 - aminopropoxy)propyltrimethoxysilane of the formula:

$$(CH_3O)_3Si-\underset{\underset{H}{|}}{\overset{\overset{H}{|}}{C}}-\underset{\underset{H}{|}}{\overset{\overset{H}{|}}{C}}-\underset{\underset{H}{|}}{\overset{\overset{H}{|}}{C}}-O-\underset{\underset{H}{|}}{\overset{\overset{H}{|}}{C}}-\underset{\underset{CH_3}{|}}{\overset{\overset{H}{|}}{C}}-\underset{\underset{H}{|}}{\overset{\overset{H}{|}}{C}}-NH_2$$

2. A method of preparing a compound within the scope of the formula:

(1)
$$R_{3-a}X_aSi-\underset{\underset{R'}{|}}{\overset{\overset{R'}{|}}{C}}-\underset{\underset{R'}{|}}{\overset{\overset{H}{|}}{C}}-\left[\underset{\underset{R'}{|}}{\overset{\overset{R''}{|}}{C}}\right]_b-O-\underset{\underset{R'}{|}}{\overset{\overset{R'}{|}}{C}}-\underset{\underset{R''}{|}}{\overset{\overset{H}{|}}{C}}-\underset{\underset{H}{|}}{\overset{\overset{H}{|}}{C}}-NH_2$$

which comprises reacting a compound of the formula:

(2)
$$R'_2C=\underset{R''}{\overset{|}{C}}-CN$$

with a compound of the formula:

(3)
$$R'_2C=\underset{R'}{\overset{|}{C}}-\left[\underset{R'}{\overset{|}{C}}\right]_b-OH$$

in the presence of a catalyst of the formula:

(4)
$$\left[\begin{array}{c}-CH-CH_2-\\ |\\ \bigcirc\\ |\\ \overset{+}{N}(CH_3)_3\\ OH^-\end{array}\right]_x\left[\begin{array}{c}-CH-CH_2-\\ |\\ \bigcirc\end{array}\right]_y$$

to produce a compound within the scope of the formula:

(5)
$$\underset{\underset{R'}{|}}{\overset{\overset{R'}{|}}{C}}=\underset{\underset{R'}{|}}{\overset{\overset{R'}{|}}{C}}-\left[\underset{\underset{R'}{|}}{\overset{\overset{R'}{|}}{C}}\right]_b-O-\underset{\underset{R'}{|}}{\overset{\overset{H}{|}}{C}}-\underset{\underset{R''}{|}}{\overset{\overset{H}{|}}{C}}-CN$$

reacting the compound of Formula 5 with a silane within the scope of the formula $R_{3-a}X_aSiH$, to produce a compound within the scope of formula:

(6)
$$R_{3-a}X_aSi-\underset{\underset{R'}{|}}{\overset{\overset{R'}{|}}{C}}-\underset{\underset{R'}{|}}{\overset{\overset{H}{|}}{C}}-\left[\underset{\underset{R'}{|}}{\overset{\overset{R'}{|}}{C}}\right]_b-O-\underset{\underset{R'}{|}}{\overset{\overset{R'}{|}}{C}}-\underset{\underset{R''}{|}}{\overset{\overset{H}{|}}{C}}-CN$$

then hydrogenating the compound of Formula 6; where R is a radical selected from the class consisting of lower alkyl radicals; cycloalkyl radicals having 5 to 7 carbon atoms in the ring; mononuclear and binuclear aryl radicals; and mononuclear aryl lower alkyl radicals; R' is a radical selected from the class consisting of lower alkyl radicals; cycloalkyl radicals having 5 to 7 carbon atoms in the ring; further radicals where two R' radicals attached to the same carbon atom, taken together with the carbon atom to which they are attached form a cycloalkyl radical having 5 to 7 carbon atoms in the ring; and hydrogen; R" is a lower alkyl radical; X is a hydrolyzable radical; $a$ has a value of 0 to 3; $b$ has a value of 1 to 4; $x$ has a value of 1000 to 1,000,000; and $y$ has a value of 2000 to 2,000,000.

3. The method of claim 2 wherein the catalyst is contained in the thimble of a Soxhlet extractor.

4. The method of claim 2 wherein the catalyst contains from 50 to 60% by weight of water.

5. The method of claim 2 wherein the hydrogenation is done at a pressure of from 20 to 100 p.s.i. in the presence of a Raney nickel catalyst.

6. The method of claim 2 wherein X is a methoxy radical, R' is hydrogen, R" is a lower alkyl radical, $a$ has a value of 3 and $b$ has a value of 1.

7. The method of claim 6 wherein R" is a methyl radical.

References Cited

UNITED STATES PATENTS

| | | | |
|---|---|---|---|
| 3,033,815 | 5/1962 | Pike et al. | 260—448.2X |
| 3,046,250 | 7/1962 | Plueddemann | 260—448.2X |
| 3,341,563 | 9/1967 | Buchheit et al. | 260—448.8 |
| 3,402,191 | 9/1968 | Morehouse | 260—448.2 |

TOBIAS E. LEVOW, Primary Examiner

W. F. W. BELLAMY, Assistant Examiner

U.S. Cl. X.R.

260—448.2N